United States Patent [19]  [11] 4,394,925
Rump et al.  [45] Jul. 26, 1983

[54] FUEL TANK-FILLER PIPE PARTICULARLY FOR MOTOR VEHICLES

[75] Inventors: Egon Rump, Cologne; Wolfgang Franzen, Hurth, both of Fed. Rep. of Germany

[73] Assignee: Ford Motor Company, Dearborn, Mich.

[21] Appl. No.: 268,452

[22] Filed: May 29, 1981

[51] Int. Cl.³ .................. B65B 3/04; B67C 3/00; G05B 00/00

[52] U.S. Cl. .................. 220/86 R; 137/587; 137/588; 138/40; 280/5 A; 285/402

[58] Field of Search .......... 220/85 VR, 86 R, 85 VS; 137/43, 587, 588, 583, 216, 590; 141/348, 346; 285/404, 402

[56] References Cited

U.S. PATENT DOCUMENTS

| 3,133,564 | 5/1964 | Hunter | 220/86 R X |
| 3,633,609 | 1/1972 | Benner | 137/590 X |
| 3,698,597 | 10/1972 | Burke | 220/86 R |
| 3,759,423 | 9/1973 | Hansel | 222/153 |
| 3,807,465 | 4/1974 | Ginsburgh et al. | 141/346 X |
| 3,907,334 | 9/1975 | Schera, Jr. | 285/404 X |
| 4,157,104 | 6/1979 | Lofquist, Jr. | 220/85 VR X |
| 4,185,844 | 1/1980 | Hubbard et al. | 220/86 R X |
| 4,306,743 | 12/1981 | Hinshaw et al. | 285/402 X |

Primary Examiner—Allan N. Shoap
Assistant Examiner—Robert Petrik
Attorney, Agent, or Firm—Peter D. McDermott; Roger L. May

[57] ABSTRACT

A fuel tank-filler neck is provided for avoiding the return of fuel from a fuel tank during the filling process. The fuel tank-filler neck is adapted to be disposed sloping upwards from the fuel tank at an oblique angle and comprises a filler pipe having an air vent in a lower portion of the filler pipe adapted to the disposed within the fuel tank; a mouth at the upper end of said filler pipe adapted to receive a fuel pump nozzle; a Venturi-type neck of reduced diameter extending the aforesaid lower portion of the filler pipe below the air vent; and an air vent pipe extending within the filler pipe from the mouth to the air vent.

5 Claims, 4 Drawing Figures

FUEL TANK-FILLER PIPE PARTICULARLY FOR MOTOR VEHICLES

The invention relates to a fuel tank-filler neck, in particular for motor vehicles, which is disposed laterally and slopes upwards at an oblique angle and has a funnel-shaped device for avoiding the return of fuel during the filling-process.

A fuel tank-filler neck of the type mentioned above is already known from German Design Patent No. 73 26 179. In the case of this filler neck the funnel-shaped device is disposed in the upper part of the filler pipe lying in the area of the bodywork and is so designed that the fuel filler gun is fixed in a very definite position. The air vent pipe here provided runs outside the filler pipe and is not taken back into the filler pipe until the vicinity of the funnel-shaped device.

This known filler neck has the disadvantage that considerable production costs are involved in the second wall entrance in the vent pipe. These wall entrances on the one hand in the fuel tank and on the other hand in the filler pipe must in fact be correspondingly securely sealed. In addition the assembly of the fuel tank in the bodywork of the motor vehicle must be carried out with a certain degree of care, so that the air vent pipe which runs separate from the filler pipe is not unduly bent or squashed.

As opposed to this a fuel tank-filler neck with an air vent pipe which runs inside the filler pipe can be made less expensively and requires no expensive sealing and no especially careful assembly in the bodywork.

In the case of this known, simpler filler neck, however, the disadvantage arises that during the filling process returns of fuel occur and lead to an undesirable spilling of the fuel occurring.

It is the function of the invention to improve a filler neck of this type in such a way that faultless filling of the fuel tank is possible using a conventional automatic fuel pump nozzle without the occurrence of fuel returns.

Since the funnel-shaped device consists of a Venturi-type neck disposed below the discharge of the air vent pipe into the lower part of the filler pipe lying in the fuel tank and a subsequent extension, an accelerated flow of fuel is brought about in this area thus safely avoiding a return of fuel due to the presence of a positive air pressure. The Venturi-type neck can here take the form of a necked-down portion integrated in the filler pipe.

On the other hand it can be even simpler to leave the filler pipe unchanged and to integrate the Venturi-type neck in a plastic extension part attached to the lower end of the filler pipe.

The end of the plastic extension part to be attached to the lower end of the filler pipe can here be provided with axial slots and fixed flexibly.

The end of the plastic extension part attached to the lower end of the filler pipe can however also be provided with a bayonet slot by means of which it can be locked positively, on a locking bolt in the filler pipe.

The construction of the Venturi-type neck in an attachable plastic extension part makes possible in a particularly favourable fashion the changing over of fuel tank filler necks during which the mentioned disadvantage occurred.

The invention is explained in more detail with the aid of an exemplified embodiment illustrated in the accompanying drawings. Shown in:

Figure 1:
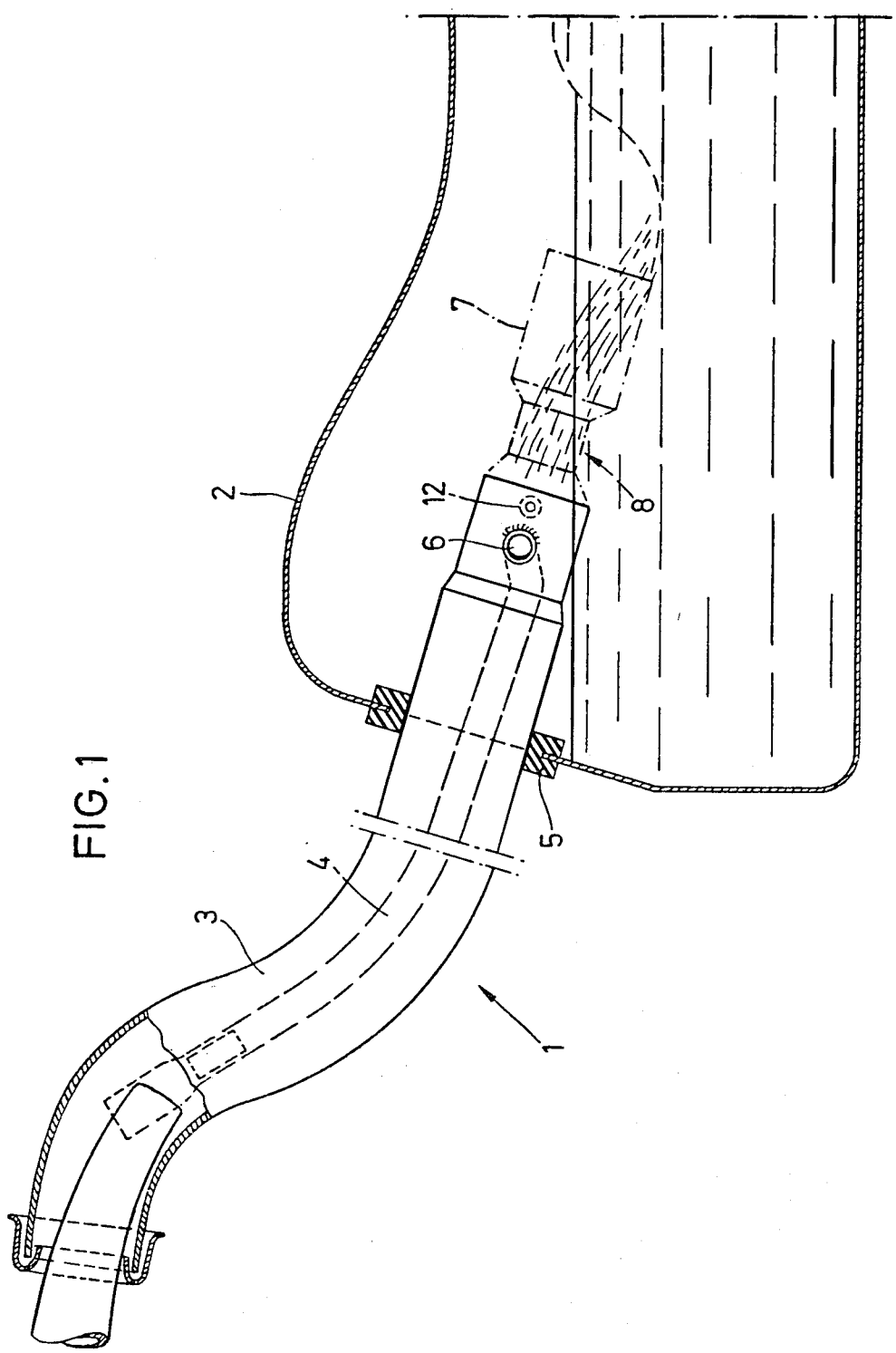
FIG. 1 is a vertical partial section through a fuel tank filler neck in its fitting position in the fuel tank of a motor vehicle, and the Venturi-type neck according to the invention is indicated as an integrated necking down of the filler pipe in dash dot dash lines.

In FIG. 1 a fuel tank-filler neck 1 is disposed laterally and sloping upwards at an oblique angle in a fuel tank 2. The filler-neck 1 here consists basically of a filler pipe 3 and an air vent pipe 4 placed inside it which in the lower end of the filler pipe introduced via a seal 5 into the fuel tank 2 is connected via an air vent 6 with the air space in the fuel tank 2.

The hitherto described construction of the fuel tank filler neck is of conventional type and is not the object of the present invention.

The invention consists of the extension 7 of the filler pipe 3 indicated in dash dot lines in which is disposed a Venturi-type neck 8 through a necking down integrated in the filler pipe 3.

The Venturi-type neck 8 causes an acceleration of the fuel-flow below the discharge 6 of the air vent pipe 4 into the filler pipe 3 during the filling process, which means that wave-movements forming in the surface of the fuel in cooperation with an increased atmospheric pressure in the air space of the fuel tank which hitherto created the undesirable fuel returns, are no longer in the position to reverse the direction of flow within the filler pipe 3. On completion of the filling process the in-flow wave trough indicated in dotted lines breaks down with the following wave crest and try to create a return of fuel. When the wave crest strikes the further open end of the filler pipe 3 the Venturi-type neck 8 acts as a restrictor, since at this moment there occurs not a continuous flow of fuel but an impact. Thus even after the fuel pump nozzle is turned off a return of fuel is avoided.

Figure 2:
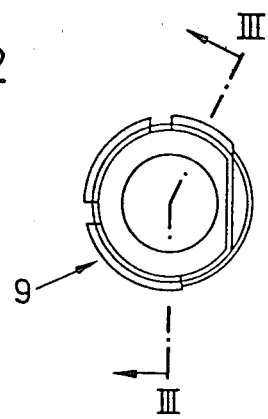
FIG. 2 is a view of a plastic extension piece according to the invention into which the Venturi-type neck is integrated.
Figure 3:
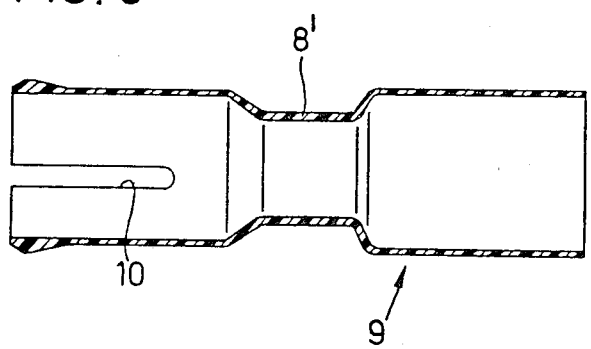
FIG. 3 is a section through the extension part along the lines III—III in FIG. 2

FIGS. 2 and 3 show instead of an integrated extension 7 of the filler pipe 3 a plastic extension part 9 which has a corresponding integrated Venturi-type neck 8'. The end of the extension part 9 to be attached to the lower end of the filler pipe 3 can have radial slots in order to clamp it flexibly to the filler pipe 3.

Figure 4:
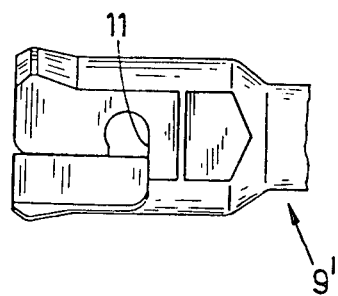
FIG. 4 is a further embodiment of the end of the extension part which can be attached to the end of the filler pipe.

FIG. 4 shows a further plastic extension part 9', in the case of which the end of the extension part 9' to be attached to the lower end of the filler pipe 3 is provided with a bayonet slot 11 by means of which it can be locked positively on a locking bolt 12 indicated in FIG. 1 by dotted lines in the filler pipe 3.

Of course a corresponding plastic extension part can also be attached by sticking with a corresponding fuel-resistant adhesive or instead of the positive locking by means of a locking bolt and a bayonet slot, locking can also be effected by means of a latch in an aperture in the filler pipe 3, such as the vent 6.

We claim:

1. A fuel tank-filler neck for avoiding the return of fuel from a fuel tank during the filling process, said fuel tank-filler neck being adapted to be disposed sloping upwards from said fuel tank at an oblique angle, comprising a filler pipe, an air vent being provided in a lower portion of said filler pipe adapted to be disposed within said fuel tank; a mouth at an upper end of said filler pipe adapted to receive a fuel pump nozzle; a Venturi-type neck of reduced diameter extending said lower portion of said filler pipe below said air vent; and an air vent pipe extending within said filler pipe from said mouth to said air vent in said lower portion of said filler pipe.

2. The fuel tank-filler neck according to claim 1 wherein said Venturi-type neck is unitary with said filler pipe.

3. The fuel tank-filler neck according to claim 1 wherein said Venturi-type neck comprises plastic, is non-unitary with said filler pipe and is attached to said filler pipe below said air vent.

4. The fuel tank-filler neck of claim 3 wherein said Venturi-type neck has axial slots and is clamped flexibly onto said filler pipe.

5. The fuel tank-filler neck of claim 3 wherein said filler pipe further comprises a locking bolt in said lower portion and said Venturi-type neck has a bayonet slot adapted to be locked positively onto said locking bolt.

* * * * *